(12) United States Patent
Collins et al.

(10) Patent No.: US 6,213,380 B1
(45) Date of Patent: Apr. 10, 2001

(54) BONDING A DIAMOND COMPACT TO A CEMENTED CARBIDE SUBSTRATE

(76) Inventors: John Lloyd Collins, 18 Rutland Park Gardens, Willesden Green, London; Graeme David Dufferwiel, 1 Woodlands, School Road, Arborfield, Near Reading, Berkshire; Christopher John Howard Wort, 61 Upthorpe Drive, Wantage, Oxfordshire; Charles Gerard Sweeney, 9 Ferrers Avenue, West Drayton, Middlesex, all of (GB)

( * ) Notice: Subject to any disclaimer, the term of this patent is extended or adjusted under 35 U.S.C. 154(b) by 0 days.

(21) Appl. No.: 09/236,076

(22) Filed: Jan. 25, 1999

(30) Foreign Application Priority Data

Jan. 27, 1998 (GB) .................................................. 9801708

(51) Int. Cl.$^7$ ..................................................... B23K 31/02
(52) U.S. Cl. ..................................... 228/122.1; 228/124.5; 228/5.1; 228/121
(58) Field of Search ............................. 228/122.1, 124.5, 228/5.1, 121; 428/457, 698, 323

(56) References Cited

U.S. PATENT DOCUMENTS

| 4,793,828 | * | 12/1988 | Burnand | .................................. | 51/293 |
| 4,871,377 | * | 10/1989 | Frushour | ................................. | 51/309 |
| 5,010,043 | * | 4/1991 | Ringwood | ............................... | 501/90 |
| 5,127,923 | * | 7/1992 | Bunting et al. | ......................... | 51/293 |
| 5,151,107 | * | 9/1992 | Cho et al. | ............................... | 51/295 |
| 5,348,108 | * | 9/1994 | Scott et al. | ............................ | 175/432 |
| 5,547,121 | * | 8/1996 | Kapoor et al. | ........................ | 228/121 |
| 5,635,256 | * | 6/1997 | Olson | ..................................... | 427/535 |
| 5,645,937 | * | 7/1997 | Noda et al. | ............................ | 428/408 |

FOREIGN PATENT DOCUMENTS

| 0 329 954 | 1/1989 | (EP) . |
| 2 163 144 | 2/1986 | (GB) . |

\* cited by examiner

*Primary Examiner*—Patrick Ryan
*Assistant Examiner*—M. Alexandra Elve
(74) *Attorney, Agent, or Firm*—Oblon, Spivak, McClelland, Maier & Neustadt, P.C.

(57) ABSTRACT

A method of bonding a diamond compact comprising a polycrystalline mass of diamond and a bonding phase which contains free-silicon to a substrate is provided. The method includes the steps of contacting a surface of the compact with carbon or nitrogen or a mixture thereof under conditions suitable to cause free-silicon in the surface to react with the carbon and/or nitrogen and thereafter bonding that surface to the substrate, preferably by means of a braze. In a preferred form of the invention, the surface which is bonded to the substrate is acid cleaned after contact of that surface with carbon or nitrogen or a mixture thereof.

13 Claims, No Drawings

BONDING A DIAMOND COMPACT TO A CEMENTED CARBIDE SUBSTRATE

BACKGROUND OF THE INVENTION

This invention relates to a method of bonding a diamond compact to a cemented carbide substrate.

Diamond compacts consist of a polycrystalline mass of diamond produced under diamond synthesis conditions. Diamond compacts have a high diamond content, for example, higher than 80 percent by volume, and generally contain a second or bonding phase. An example of a second or bonding phase is one which contains silicon, with or without a diamond catalyst/solvent. The silicon will be present largely as silicon carbide, although some residual elemental silicon will also be present.

Diamond compacts are brittle and are generally bonded to a substrate, particularly a cemented carbide substrate, for cutting and other similar operations. Bonding of silicon-containing diamond compacts to substrates presents problems. Where a braze is used for the bonding, the strengh of the braze joint can be reduced by impurities which diffuse from either the substrate or the compact into the braze layer. More particularly, for siliconcontaining compacts, even minute quantities of residual, unreacted freesilicon from the binder phase reacts preferentially with the braze producing a highly inconsistent and weakened braze joint between the compact and the substrate.

SUMMARY OF THE INVENTION

According to the present invention, a method of bonding a diamond compact comprising a polycrystalline mass of diamond and a bonding phase which contains free-silicon to a substrate includes the steps of contacting a surface of the compact with carbon or nitrogen or a mixture thereof under conditions suitable to cause free-silicon in the surface to react with the carbon and/or nitrogen and thereafter bonding that surface to the substrate, preferably by means of a braze.

The source of the carbon may be graphite or amorphous carbon or it may be produced in situ by decomposition or pyrolysis of a carbon-containing gas, e.g. a hydrocarbon. A silicon carbide or sub-carbide compound will be formed.

The source of nitrogen may be solid or gaseous and a silicon nitride or subnitride compound will be formed.

The invention has particular application to diamond compacts comprising a polycrystalline mass of diamond particles present in an amount of 80 to 90 percent by volume of the compact and the bonding phase present in an amount of 10 to 20 percent by volume of the compact, the bonding phase consisting essentially of silicon or silicon carbide or a combination thereof. An example of such a compact is that described in U.S. Pat. No. 4,793,828. An example of a commercially available form of such a compact is that sold under the trade name SYNDAX 3®.

In one preferred form of the invention, the surface of the diamond compact which is bonded to the substrate is acid cleaned after contact of the surface with the carbon or nitrogen, or mixture thereof and before bonding to the substrate. The acid treatment is preferably carried out with a strong acid such as sulphuric acid or chromic acid and more preferably with fuming sulphuric acid. It has been found that the presence of an oxidizing agent such as a nitrate improves the acid cleaning. Thus, a typical acid cleaning may involve the steps of treating the diamond compact surface with the acid in the presence of an oxidizing agent and thereafter washing the acid cleaned surface with water, e.g. deionised water.

Where a braze is used to bond the treated diamond compact surface to the substrate, any known commercially available braze may be used. Examples of such brazes are a titanium/copper/silver braze (e.g. Ti 4,5%, Cu 26,7%, Ag 68,8%) and a silver/copper/indium braze (e.g. Ag 75%, Cu 20%, In 5%).

The substrate will generally be a cemented carbide substrate. Cemented carbide substrates are known in the art and comprise a mass of carbide particles, for example, tungsten carbide particles, bonded into a hard, coherent form by means of a binder metal such as cobalt, iron, nickel or an alloy containing one or more of these metals.

DESCRIPTION OF EMBODIMENTS

An embodiment of the invention will now be described. A plurality of SYNDAX 3® pieces were cleaned and immersed in a carbon-containing environment in a vacuum furnace substantially free of oxygen. The environment may also be an inert gas such as argon, substantially free of oxygen. The carbon-containing environment may be provided by a graphite-powder filled refractory boat, or by means of a stream of hydrocarbon, e.g. butane, which decomposes to produce carbon. The SYNDAX 3® pieces were maintained at a temperature of 950° C. in this environment for a period of time. Free-carbon diffused into the surface of the SYNDAX 3® pieces reacting with the free-silicon in the surfaces to form silicon carbide or sub-carbide compounds. This reaction or surface passivation took place to a depth of about 1$\mu$m. The diffusion process is temperature and time dependent; low temperatures requiring longer times to achieve the same amount of diffusion. Typical reaction conditions are 950° C. for 30 hours when the SYNDAX 3® pieces which were immersed in graphite powder and held under a vacuum of less than $1 \times 10^6$ mbar.

The SYNDAX 3® pieces were then acid cleaned. The acid cleaning involved the following steps:

(i) Sulphuric acid was heated until fuming and the samples then added to the fuming sulphuric acid and left for a period of typically 10 minutes.

(ii) An oxidising agent such as potassium nitrate was added and the pieces left for a further period, again typically of 10 minutes.

(iii) The pieces were removed from the cleaning medium and placed in deionised water, decanted and the steps repeated with more deionised water. Washing with deionised water has the effect of reducing the total ion concentration to avoid precipitation of ionic species on the SYNDAX 3® surfaces, (iv) The cleaned and washed pieces were placed in a solvent such as acetone and ultrasonically cleaned for a period of typically 5 minutes. The pieces were removed from the solvent.

The thus treated SYNDAX 3® pieces may now be brazed to a cemented carbide substrate using any commercially available braze.

A batch of 50 SYNDAX 3® pieces were treated in the manner described above. Thereafter, the pieces were brazed to tungsten carbide substrates in a reducing atmosphere of argon/hydrogen (95%/5%). The braze used was a titanium/copper/silicon braze alloy. The shear strength of the bonds achieved was thereafter tested using a standard shear strength testing machine. It was found that 48 of the samples had a shear strength higher than 172,368N/mm$^2$ while 33 of the samples exceeded a shear strength of 241N/mm$^2$. The lower of the two shear strength limits is a minimum that the market will accept, whilst the higher of the shear strength limits is one which is considered most desirable by the market.

The excellent shear strengths obtained are to be contrasted with those obtainable using known methods of cleaning and/or treating SYNDAX 3® pieces. SYNDAX 3® pieces were etched in a 50/50 concentration of hydrofluoric/nitric acid to remove free silicon present in the sample surfaces. 30 samples in all were prepared and the samples were then brazed to cemented carbide substrates in a reducing atmosphere of argon/hydrogen (95%/5%) using a titanium/copper/silicon braze alloy. A nickel shim was placed between layers of the braze alloy. The nickel shim was used to compensate for the difference in thermal expansion between the compact and carbide.

The brazed pieces were then subjected to a shear strength test as described above. The highest shear strength obtained was $167,1 N/mm^2$. Not only was the shear strength obtained much lower than that for the SYNDAX 3® pieces treated according to the invention, but the scatter of the results was greater.

Brazing of SYNDAX 3® pieces, as described above, was repeated except that they were tinned prior to brazing to the substrate. This did not improve the shear strength which remained below $172,368 N/mm^2$.

We claim:

1. A method of bonding a diamond compact comprising a polycrystalline mass of diamond and a bonding phase which contains free-silicon to a substrate comprising the steps of contacting a surface of the compact with carbon or nitrogen or a mixture thereof under conditions suitable to cause free-silicon in the surface to react with the carbon, nitrogen, or a mixture thereof and thereafter bonding that surface to the substrate.

2. A method according to claim 1 wherein bonding of the surface of the diamond compact to the substrate is achieved by means of a braze.

3. A method according to claim 2 wherein the braze is a member selected from the group consisting of titanium/copper/silver brazes and silver/copper/indium brazes.

4. A method according to claim 1 wherein the source of carbon is selected from graphite, amorphous carbon, and carbon produced by the decomposition or pyrolysis of a carbon-containing gas.

5. A method according to claim 1 wherein the surface of the diamond compact is acid cleaned after contact of the surface with carbon or nitrogen or a mixture thereof and before the surface is bonded to the substrate.

6. A method according to claim 5 wherein the acid is a strong acid.

7. A method according to claim 6 wherein the acid is a member selected from the group consisting of sulphuric acid chromic acid and mixtures thereof.

8. A method according to claim 6 wherein the acid is fuming sulphuric acid.

9. A method according to claim 5 wherein the acid cleaning is carried out in the presence of an oxidizing agent.

10. A method according to claim 9 wherein the oxidizing agent is a nitrate.

11. A method according to claim 1 wherein the substrate is a cemented carbide substrate.

12. A method according to claim 11 wherein the cemented carbide is cemented tungsten carbide.

13. A method according to claim 1 wherein the diamond compact comprises a polycrystalline mass of diamond present in an amount of 80 to 90 percent by volume of the compact and a bonding phase present in an amount of 10 to 20 percent by volume of the compact, the bonding phase consisting essentially of silicon or silicon carbide or a combination thereof.

* * * * *

UNITED STATES PATENT AND TRADEMARK OFFICE
CERTIFICATE OF CORRECTION

PATENT NO. : 6,213,380 B1
DATED : April 10, 2001
INVENTOR(S) : John L. Collins et al.

It is certified that error appears in the above-identified patent and that said Letters Patent is hereby corrected as shown below:

Column 1,
Line 23, "siliconcontaining" should read -- silicon-containing --.
Line 24, "freesilicon" should read -- free-silicon --.

Column 2,
Line 33, "$1 \times 10^6$ mbar" should read -- $1 \times 10^{-6}$ mbar --.

Column 4,
Line 15, "sulphuric acid" should read -- sulphuric acid, --.

Signed and Sealed this

Twenty-sixth Day of February, 2002

Attest:

JAMES E. ROGAN
Attesting Officer
Director of the United States Patent and Trademark Office